(12) United States Patent
Guo

(10) Patent No.: US 12,302,320 B2
(45) Date of Patent: May 13, 2025

(54) METHODS AND APPARATUS OF SINGLE COMMON BEAM-BASED OPERATION

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 311 days.

(21) Appl. No.: 17/841,437

(22) Filed: Jun. 15, 2022

(65) Prior Publication Data

US 2022/0312456 A1 Sep. 29, 2022

Related U.S. Application Data

(63) Continuation of application No. PCT/CN2020/137324, filed on Dec. 17, 2020.

(60) Provisional application No. 62/949,646, filed on Dec. 18, 2019.

(51) Int. Cl.
| | |
|---|---|
| H04W 72/1273 | (2023.01) |
| H04L 1/1812 | (2023.01) |
| H04L 5/00 | (2006.01) |
| H04W 16/28 | (2009.01) |
| H04W 72/23 | (2023.01) |

(52) U.S. Cl.
CPC ....... *H04W 72/1273* (2013.01); *H04L 1/1812* (2013.01); *H04L 5/0053* (2013.01); *H04W 16/28* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2019/0342907 A1 | 11/2019 | Huang et al. | |
| 2022/0271890 A1* | 8/2022 | Grossmann | ........... H04L 5/0051 |

FOREIGN PATENT DOCUMENTS

| | | | |
|---|---|---|---|
| WO | 2018232090 A1 | 12/2018 | |
| WO | WO-2019143900 A1 * | 7/2019 | ........... H04L 1/1819 |
| WO | 2019182429 A1 | 9/2019 | |
| WO | 2019195528 A1 | 10/2019 | |

(Continued)

OTHER PUBLICATIONS

First Office Action issued in corresponding European application No. 20902513.9, mailed Jan. 31, 2024, 6 pages.

(Continued)

*Primary Examiner* — Lonnie V Sweet
(74) *Attorney, Agent, or Firm* — BAYES PLLC

(57) ABSTRACT

Disclosed herein are apparatus and methods to operate a communication device (UE) in a common beam mode. According to an aspect, the UE may assume that beam characteristics for a single common beam can be reused by multiple channels and reference signals without the need for repeated signaling indicating the Tx beam in subsequent transmissions, such that network bandwidth consumption can be reduced and latency can be improved. In some embodiments, the common beam may be indicated with a TCI-state through a L1 signaling such as DCI signaling. In some embodiments, the common beam may be indicated with a TCI-state through a MAC CE message.

14 Claims, 8 Drawing Sheets

(56) References Cited

FOREIGN PATENT DOCUMENTS

| WO | 2021090507 A1 | 5/2021 |
|---|---|---|
| WO | 2021091172 A1 | 5/2021 |
| WO | 2021118326 A1 | 6/2021 |
| WO | 2021126721 A1 | 6/2021 |

OTHER PUBLICATIONS

International Search Report dated Mar. 17, 2021 from the International Searching Authority Re. Application No. PCT/CN2020/137324, 2 pages.
Written Opinion dated Mar. 17, 2021 from the International Searching Authority Re. Application No. PCT/CN2020/137324, 4 pages.
"On beam indication, measurement, and reporting", Source: Ericsson, 3GPP TSG-RAN WG1 #90bis, R1-1718433, Prague, Czech Republic, Oct. 9-13, 2017, 9 pages.
"On common beam for PDSCH and PDCCH", Source: Ericsson, 3GPP TSG-RAN WG1 #90bis, R1-1718746, Prague, Czech Republic, Oct. 9-13, 2017, 5 pages.
"Discussion on Beam Management", Source: Intel Corporation, 3GPP TSG-RAN WG1 Meeting #90bis, R1-1717368, Prague, Czech, Oct. 9-13, 2017, 7 pages.
3GPP TS 38.211 V15.5.0 (Mar. 2019); Technical Specification Group Radio Access Network; NR; Physical channels and modulation (Release 15), 92 pages.
3GPP TS 38.212 V15.5.0 (Mar. 2019); Technical Specification Group Radio Access Network; NR; Multiplexing and channel coding (Release 15), 98 pages.
3GPP TS 38.213 V15.5.0 (Mar. 2019); Technical Specification Group Radio Access Network; NR; Physical layer procedures for control (Release 15), 104 pages.
3GPP TS 38.214 V15.5.0 (Mar. 2019); Technical Specification Group Radio Access Network; NR; Physical layer procedures for data (Release 15), 103 pages.
3GPP TS 38.215 V15.5.0 (Jun. 2019); Technical Specification Group Radio Access Network; NR; Physical layer measurements (Release 15), 16 pages.
3GPP TS 38.321 V15.5.0 (Mar. 2019); Technical Specification Group Radio Access Network; NR; Medium Access Control (MAC) protocol specification (Release 15), 77 pages.
3GPP TS 38.331 V15.5.0 (Mar. 2019); Technical Specification Group Radio Access Network; NR; Radio Resource Control (RRC) protocol specification (Release 15), 489 pages.
"On UL beam indication", Source: Ericsson, 3GPP TSG-RAN WG1 #90bis, R1-1718747,Prague, Czech Republic, Oct. 9-13, 2017, 4 pages.
"On Beam Management, Measurement and Reporting", Source: Samsung, 3GPP TSG RAN WG1 Meeting 90bis, R1-1717605, Prague, CZ, Oct. 9-13, 2017, 16 pages.
"Beam indication for control and data channels", Source: Huawei, HiSilicon, 3GPP TSG RAN WG1 Meeting #90, R1-1712222, Prague, Czech Republic, Aug. 21-25, 2017, 7 pages.
"Feature lead summary#2 of Enhancements on Multi beam Operations", Source: LG Electronics, 3GPP TSG RAN WG1 Meeting #97, R1-1907768, Reno, USA, May 13-17, 2019, 35 pages.
Extended European Search Report issued in corresponding European application No. 20902513.9, mailed Nov. 23, 2022, 11 pages.
Ericsson, "Analysis of beam indication signalling options", R1-1718743, 3GPP TSG RAN WG1 Meeting 90bis Prague, CZ, Oct. 9-13, 2017, 14 pages.
Communication pursuant to Article 94(3) EPC issued in corresponding European Application No. 20902513.9, mailed on Jan. 30, 2025, 6 pages.

* cited by examiner

METHODS AND APPARATUS OF SINGLE COMMON BEAM-BASED OPERATION

CROSS REFERENCE OF RELATED APPLICATIONS

The present application is a continuation of International Application No. PCT/CN2020/137324, filed on Dec. 17, 2020, which claims the priority of U.S. Provisional Application No. 62/949,646, filed on Dec. 18, 2019, the contents of which are incorporated herein by reference in their entireties.

TECHNICAL FIELD

The present application relates to the field of wireless communication.

BACKGROUND

In NR/5G wireless communication systems, support is provided for multi-beam operation on downlink and uplink physical channels and reference signals. The use case for supporting multi-beam operation mainly is for deployment of high-frequency band systems, where high-gain analog beamforming is used to combat large path loss.

Signaling may be used to indicate the beam for UE's transmission of physical channels and reference signals. For example, a beam may be indicated as being used for PDCCH/PDSCH/CSI-RS/PUSCH/SRS/PUCCH through the framework of TCI-state for downlink transmission or spatial relation for uplink transmission.

The following publications are herein incorporated by reference in their entirety.

3GPP TS 38.211 V15.5.0: "NR; Physical channels and modulation"
3GPP TS 38.212 V15.5.0: "NR; Multiplexing and channel coding"
3GPP TS 38.213 V15.5.0: "NR; Physical layer procedures for control"
3GPP TS 38.214 V15.5.0: "NR; Physical layer procedures for data"
3GPP TS 38.215 V15.5.0: "NR; Physical layer measurements"
3GPP TS 38.321 V15.5.0: "NR; Medium Access Control (MAC) protocol specification"
3GPP TS 38.331 V15.5.0: "NR; Radio Resource Control (RRC) protocol specification"

SUMMARY

Disclosed herein are apparatus and methods to operate a communication device (UE) in a common beam mode. According to an aspect, the UE may assume that beam characteristics for a single common beam can be reused by multiple channels and reference signals without the need for repeated signaling indicating the Tx beam in subsequent transmissions, such that network bandwidth consumption can be reduced and latency can be improved. In some embodiments, the common beam may be indicated with a TCI-state through a L1 signaling such as DCI signaling. In some embodiments, the common beam may be indicated with a TCI-state through a MAC CE message.

In some embodiments, the UE can be configured to operate a common-beam mode. The UE may be provided with a reference signal ID and the UE may apply the provided reference signal ID on the reception of PDCCH, PDSCH, CSI-RS not configured with higher layer parameter repetition and also on the transmission of PUSCH, PUCCH and SRS not configured for beamManagement.

In some embodiments, the UE can be configured to operate a common-beam mode over multiple serving cells. The UE may be provided with a reference signal ID and the UE may apply the provided reference signal ID on the reception of PDCCH, PDSCH and CSI not configured with higher layer parameter repetition in any of the serving cells configured in the list of serving cells for common-beam operation, and apply the provided reference signal ID on the transmission of PUSCH, PUCCH and SRS not configured for beamManagement in any of the serving cells configured in the list of serving cells for common-beam operation.

Some embodiments are directed to a method of operating a communication device to wirelessly communicate with a beam. The method comprises receiving a reference transmission that provides a reference signal ID indicative of one or more characteristics of the beam for multiple uplink channels, downlink channels and reference signals; and configuring, by the communication device, one or more transmissions subsequent to receiving the reference transmission based on the one or more characteristics of the beam indicated in the reference signal ID.

Some embodiments are directed to a communication device. The communication device comprises a receiving unit adapted to receive a reference transmission that provides a reference signal ID indicative of one or more characteristics of a beam; and a processor adapted to configure one or more transmissions subsequent to receipt of the reference transmission based on the one or more characteristics of the beam indicated in the reference signal ID.

Some embodiments are directed to a communication device. The communication device comprises a receiving unit configured to receive a wireless signal; at least one processor; and at least one memory having instructions that, when executed by the at least one processor, cause the communication device to perform any of the methods disclosed herein.

Some embodiments are directed to at least one non-transitory computer-readable medium. The computer-readable medium is encoded with computer-executable instructions that, when executed by a processor of a communication device, controls the processor to perform any of the methods disclosed herein.

In some embodiments, the reference signal ID may be carried through a TCI-state. The reference transmission may comprise a DCI signaling.

In some embodiments, the one or more characteristics of the beam may comprise a QCL value, for example, a QCL-typeD value.

In some embodiments, configuring the one or more transmissions comprises: assuming the QCL value for the one or more transmissions. In such embodiments, the one or more transmissions may be downlink transmissions that comprise one or more of: a PDCCH; a PDSCH; a CSI-RS resource configured with higher layer parameter trs-info; and a CSI-RS resource configured without higher layer parameter trs-info and without higher layer parameter repetition.

In some embodiments, the one or more characteristics of the beam comprises a spatial domain transmission filter for uplink channels and reference signals. In such embodiments, configuring the one or more transmissions comprise: assuming the spatial domain transmission filter for the one or more transmissions. In such embodiments, the one or more transmissions may be uplink transmissions that comprise one or more of: a PUSCH; a PUCCH; and an SRS resource that is not configured for beamManagement.

In some embodiments, the method may further comprise: receiving a first DCI scheduling a PDSCH transmission indicating a first TCI-state. In such embodiments, the first DCI may be the reference transmission and the reference signal ID is carried in the first TCI state indicated by a first TCI-state ID. The method may further comprise: requesting transmission of a HARQ-ACK for the scheduled PDSCH at slot m. Configuring the one or more transmissions may comprise: assuming the one or more characteristics of the beam indicated in the first TCI-state for the one or more transmissions starting from a given time point after sending the HARQ-ACK at slot m.

In some embodiments, the first DCI may indicate slot n, and the method may further comprise: receiving a second DCI indicating a second TCI-state in slot n. In such embodiments, the second DCI does not schedule PDSCH or PUSCH transmission. The second DCI may be the reference transmission and the reference signal ID may be a second TCI-state ID indicating the second TCI-state.

In some embodiments, the method may further comprise: decoding the second DCI. Configuring the one or more transmissions may comprise: subsequent to decoding the second DCI, requesting transmission of a HARQ-ACK in slot n+m; subsequent to transmitting the HARQ-ACK, assuming the one or more characteristics of the beam indicated in the second TCI-state ID for the one or more transmissions starting from a given time point after transmitting the HARQ-ACK in slot $n+n_1$.

In some embodiments, the first DCI may indicate slot n, and the first DCI may be associated with a first HARQ process number. In such embodiments, the method may further comprise: receiving a third DCI scheduling a PUSCH transmission indicating a third TCI-state in slot n. The third DCI may be associated with a second HARQ process number. The method may further comprise comparing the first and second HARQ process numbers, and upon determining that the first HARQ process number equals the second HARQ process number, assuming the reference signal ID is the second TCI-state ID indicating the second TCI-state.

In such embodiments, the third DCI may have a toggled NDI value in slot m, and configuring the one or more transmissions comprises: assuming the one or more characteristics of the beam indicated in the second TCI-state ID for the one or more transmissions starting from a slot that is after slot m.

In some embodiments, the reference transmission comprises a MAC CE message.

In some embodiments, the method may further comprise: at a first time, transmitting a HARQ-ACK for a PDSCH carrying the MAC CE message. Configuring the one or more transmissions comprises: assuming the one or more characteristics of the beam indicated in the reference signal ID for the one or more transmissions starting from a given time point after sending the HARQ-ACK.

In some embodiments, the MAC CE message may indicate a TCI-state ID. The reference signal ID may be the TCI-state ID.

In some embodiments, the reference signal ID may be a beam ID.

In some embodiments, the communication device may be configured to operate with a plurality of serving cells. In such embodiments, configuring the one or more transmissions comprises: applying the one or more characteristics of the beam on transmission of the one or more transmissions in one or more of the plurality of serving cells. In such embodiments, the method may further comprise receiving a list of the plurality of serving cells. The method may further comprise receiving an identification of a serving cell of the plurality of serving cells; and determining a list of the plurality of serving cells based on the identification of the serving cell.

BRIEF DESCRIPTION OF THE DRAWINGS

Various aspects and embodiments of the disclosure will be described with reference to the following figures. It should be appreciated that the figures are not necessarily drawn to scale. Items appearing in multiple figures are indicated by the same reference number in all the figures in which they appear. In the drawings.

DETAILED DESCRIPTION

Figure 1:
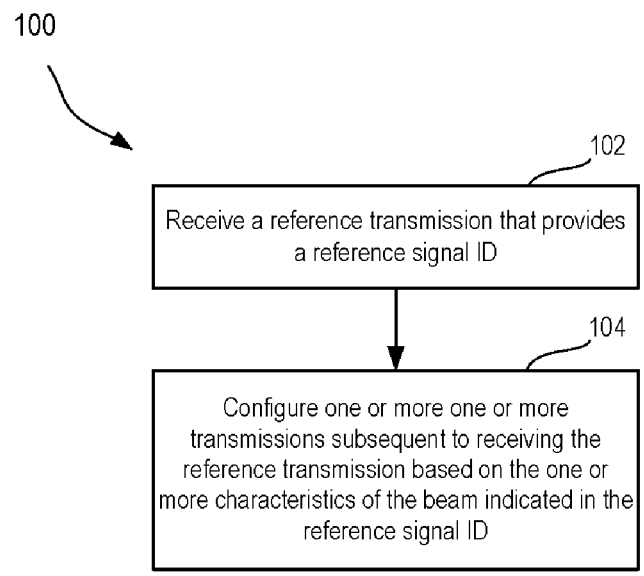
FIG. 1 is a schematic flow diagram illustrating an exemplary method of a common-beam mode operation, in accordance with some embodiments.

The following is a list of abbreviations that may be found throughout the specification and/or the drawings.
3GPP $3^{rd}$ Generation Partnership Project
5G $5^{th}$ Generation
NR New Radio
gNB Next generation NodeB
DL Downlink
UL Uplink
PUSCH Physical Uplink Shared Channel
PUCCH Physical Uplink Control Channel
PDSCH Physical Downlink Shared Channel
PDCCH Physical Downlink Control Channel
SRS Sounding Reference Signal
CSI Channel state information
CSI-RS Channel state information reference signal
CSI-IM Channel state information-interference measurement
NZP CSI-RS Non-zero-power Channel state information reference signal
RS Reference Signal
CC Control Channel
CORESET Control Resource Set
DCI Downlink control information
TRP Transmission/reception point
ACK Acknowledge
NACK Non-Acknowledge UCI Uplink control information
RRC Radio Resource Control
HARQ Hybrid Automatic Repeat Request
MAC Media Access Control
CRC Cyclic Redundancy Check
RNTI Radio Network Temporary Identity
RB Resource Block
PRB Physical Resource Block
NW Network
NDI New Data Indicator
RSRP Reference signal received power
L1-RSRP Layer 1 Reference signal received power
TCI Transmission Configuration Indicator
Tx Transmission
Rx Receive
QCL Quasi co-location
SSB SS/PBCH Block
PBCH Physical broadcast channel
SSS Secondary synchronization signal
CRI CSI-RS resource indicator
SSBRI SS/PBCH block resource indicator
SINR Signal to Interference Noise Ratio
L1-SINR Layer 1 Signal to Interference Noise Ratio
DMRS Demodulation Reference Signal
$N_{slot}^{subframe,\mu}$ Number of slots per subframe for subcarrier spacing configuration µ

The inventor has recognized that there are shortcomings associated with the current approaches of indicating beam used for PDCCH/PDSCH/CSI-RS/PUSCH/SRS/PUCCH through the framework of TCI-state for downlink transmission or spatial relation for uplink transmission.

In NR release 15 and release 16, for PDCCH and PDSCH, the UE may be configured with M TCI-states in higher layer signaling as the candidate QCL configuration. For each CORESET for PDCCH transmission, the UE can be configured with one or more TCI-states semi-statically and if more than one TCI-states are configured, one MAC CE command is used to activate one of those TCI-states as the active Tx beam for PDCCH transmission. For PDSCH, one MAC CE activation command can activate up to 8 TCI-state and each TCI-state is mapped to one codepoint in the DCI scheduling PDSCH transmission. Then for each individual PDSCH transmission, the NW can dynamically indicate one of those up to 8 TCI-states through the scheduling DCI.

The Tx beam information for CSI-RS transmission is indicated through a TCI-state configured or indicated to a CSI-RS resource. For a periodic CSI-RS resource, the TCI-state is configured in RRC semi-statically. For a semi-persistent CSI-RS resource, the TCI-state can be configured in RRC semi-statically or indicated in the MAC CE message that activates the transmission of semi-persistent CSI-RS. For an aperiodic CSI-RS resource, the TCI-state is configured to the CSI-RS resource in the configuration of aperiodic CSI-RS trigger state in RRC. Then the gNB can use physical layer signaling to dynamically trigger the transmission of aperiodic CSI-RS transmission and also dynamically indicate the Tx beam information.

For SRS transmission, the UE Tx beam is configured or indicated through spatial relation info. For periodic SRS transmission, the spatial relation info is configured per SRS resource in RRC semi-statically. For aperiodic SRS transmission, the spatial relation info can be configured in RRC semi-statically, which is one method and another method is the NW can use one MAC CE to update/indicate spatial relation info for a SRS resource, which thus provide more dynamic spatial relation info updating. For semi-persistent SRS transmission, the spatial relation info can be included in the MAC CE activation command that activates the transmission of semi-persistent SRS resource.

For PUCCH transmission, the UE Tx beam is configured through PUCCH spatial relation info. The UE is provided with one or more than one PUCCH spatial relation info configurations in RRCH semi-statically. Then for each PUCCH resource, the UE can be indicated with one PUCCH spatial relation info through a MAC CE activation command.

In NR release 16, to reduce the number of MAC CE messages for indicating TCI-states for PDCCH and PDSCH, a method of using a single MAC CE message to indicate the same TCI state ID (identification) or same set of TCI state IDs for PDCCH or PDSCH in multiple CCs.

The inventor has recognized that while signaling to indicate to the Tx beam to use for each channel allows flexibility to configure different beam conditions for transmission of each channel, such flexibility is at the expense of a large amount of network overhead and lead to increased latency when there are a large number of channels. For example, a UE may need to configure more than 100 downlink channels, uplink channels and reference signals. Even though in practice the downlink and uplink transmission would use the same "best" beam pair link, current method still uses separate signaling to indicate the Tx beam for downlink and uplink transmissions. As a consequence, signaling overhead is increased and thus latency of beam switch is increased.

Further, in current methods the TCI-state for PDCCH and PDSCH is configured in each CC. In intra-band CA (carrier aggregation) scenario, the system would apply the same Tx beams on the transmission in all the cells, yet the current method requires to configure TCI-states in each cell and indicates the same TCI-state IDs for PDCCH and PDSCH in different CCs. Even though the system can configure same QCL-TypeD reference signal in the TCI states with a same ID in different CCs by implementation so that same Tx beam(s) is applied to the PDCCH and PDSCH in different CCs, that approach would impose a large limitation on NW implementation. When the Tx beam is switched for a different beam for PDCCH and PDSCH due to UE mobility, the NW would have to re-configure the TCI-states in all the CCs, which increases the signaling overhead and increases the latency too.

The inventor has appreciated and recognized that in practice, the Tx beam to a UE may remain the same for a considerable amount of time, and that the UE can assume that beam characteristics for a single common beam can be reused by multiple channels without the need for repeated control signal signaling to tell UE which beam to assume in subsequent transmission. By reusing beam characteristics indicated for one common beam for transmission of multiple uplink channels, downlink channels, and reference signals, the UE may no longer require the network to send signaling indicating the Tx beam for such channels and as a result, network overhead can be reduced and latency can be improved.

Aspects of the present disclosure are directed to a common-beam mode operation.

In some embodiments, a UE can be configured to operate in a common-beam mode. FIG. 1 is a schematic flow diagram illustrating an exemplary method 100 of a common-beam mode operation. In such embodiments, the UE can be provided with a reference signal ID, for example by receiving a reference transmission that provides the reference signal ID as shown at block 102 of FIG. 1. The reference signal ID may indicate one or more characteristics of a common beam for the UE, and in some embodiments may be a gNB Tx beam ID. The common beam may be a beam for multiple uplink channels, downlink channels and reference signals.

Still referring to FIG. 1, the UE may at block 104 configure one or more one or more transmissions subsequent to receiving the reference transmission based on the one or more characteristics of the beam indicated in the reference signal ID.

In some embodiments, the reference signal ID may indicate beam characteristics that can comprise a QCL value or the information on UE spatial domain transmission filter, or both. For example, the UE may assume the reference signal identified by the reference signal ID provides QCL-typeD assumption for the reception of one or more of the following downlink transmissions:

The PDCCH
The PDSCH
The CSI-RS transmission for CSI acquisition
The CSI-RS resource configured for tracking.

In such embodiments, the UE may alternatively or additionally assume the reference identified by the first reference signal ID provides spatial relation info such as but not limited to the information on UE spatial domain transmission filter for the transmission of one or more of the following uplink transmissions:

The PUSCH
The PUCCH
The SRS resource used for codebook-based transmission, the non-codebook-based transmission and for antenna switching.

As an effect of the embodiments discussed above, as the UE assumes the common beam in transmission of more than one transmission of physical channels and reference signals, the network may stop sending additional signaling for beam characteristics and network bandwidth consumption and latency may be improved.

Figure 2:
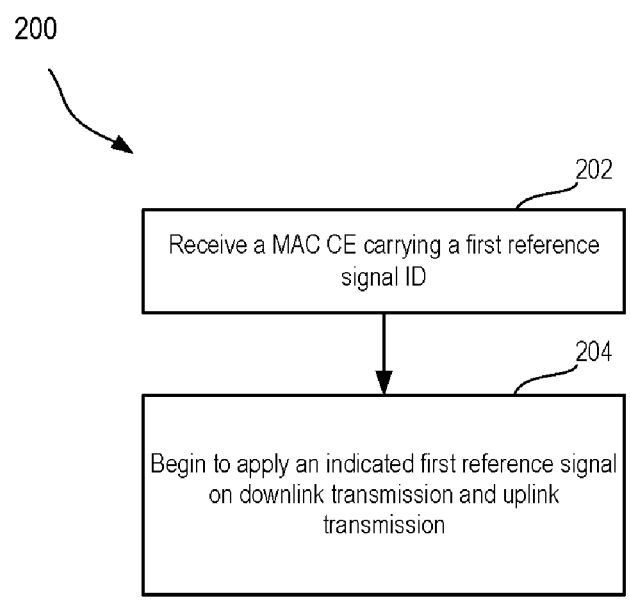
FIG. 2 is a schematic flow diagram illustrating an exemplary implementation of the common beam operation with a MAC CE message, in accordance with some embodiments.

FIG. 2 is a schematic flow diagram illustrating an exemplary implementation method 200 of the common beam operation with a MAC CE message. In some embodiments, a first reference signal ID may be indicated in a MAC CE message. In such embodiments, when the UE receives MAC CE carrying the first reference signal ID as shown in block 202 in FIG. 2, the UE may begin to apply the indicated first reference signal on downlink transmission and uplink transmission. The UE may at block 204 begin to apply the indicated first reference signal starting from a given time point after the UE transmits the HARQ-ACK for the PDSCH carrying the MAC CE message indicating the first reference signal ID, for example starting from the first slot after k=3 ms, although aspects of the present disclosure are not so limited and it should be appreciated that any suitable time point after transmission of the HARQ-ACK may be used.

Figure 3:
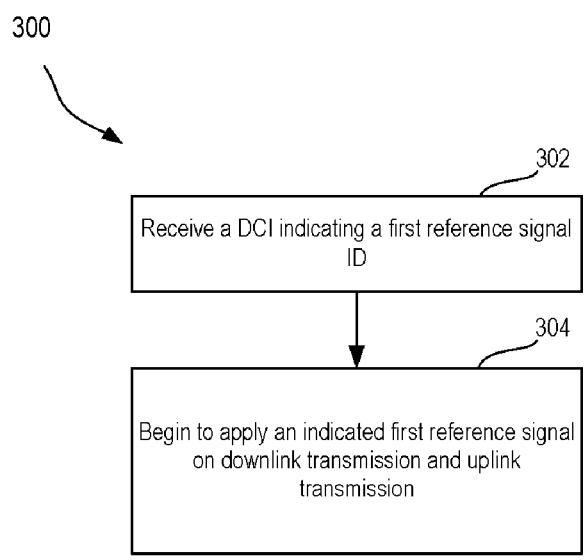
FIG. 3 is a schematic flow diagram illustrating yet another exemplary implementation of the common beam operation with DCI signaling, in accordance with some embodiments.

FIG. 3 is a schematic flow diagram illustrating yet another exemplary implementation method 300 of the common beam operation with DCI signaling. In some embodiments, the first reference signal ID may be indicated in a DCI signaling. The DCI can be a DCI scheduling a PDSCH transmission, a DCI scheduling a PUSCH transmission, or a DCI without scheduling a PDSCH or PUSCH. In such embodiments, when the UE receives DCI indicating the first reference signal ID at block 302 in FIG. 3, the UE may at block 304 begin to apply the indicated first reference signal on downlink transmission and uplink transmission starting from a given time point after the UE sends the positive acknowledge to the PDSCH scheduled by the DCI, or to the DCI or after UE receive DCI scheduling new uplink transmission for the same HARQ process number if the DCI schedules PUSCH transmission. The given time point may be for example starting from the first slot after k ms, although aspects of the present disclosure are not so limited and it should be appreciated that any suitable time point may be used.

Figure 4:
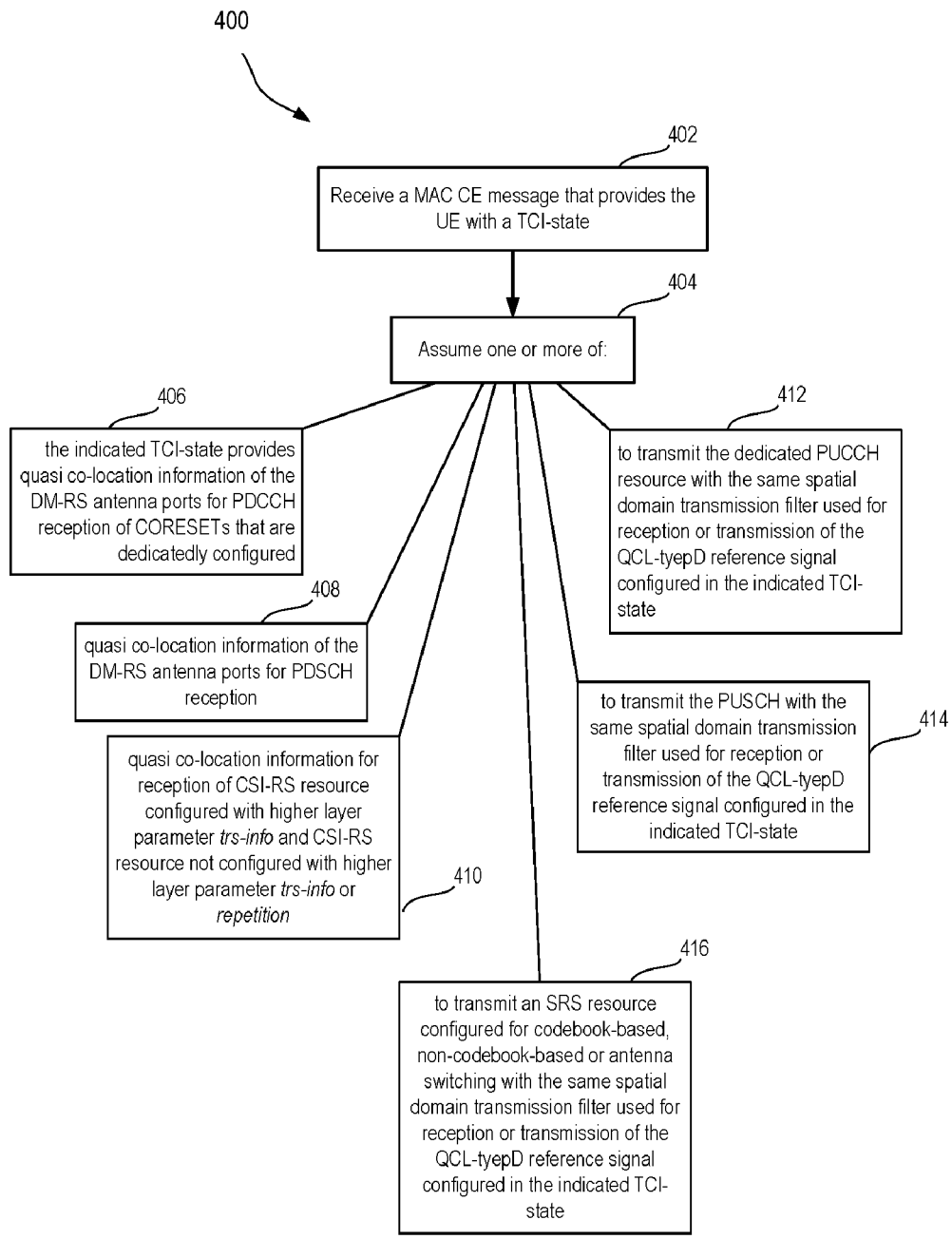
FIG. 4 is a schematic flow diagram illustrating an exemplary method using a MAC CE message, according to an embodiment.

FIG. 4 is a schematic flow diagram illustrating an exemplary method 400 using a MAC CE message, in accordance with a first embodiment. According to the first embodiment in which a UE is configured to operate in a common beam mode, the UE may receive a MAC CE message that provides the UE with a TCI-state (block 402 in FIG. 4). In such an embodiment, the UE may assume at block 404 one or more of the following: the indicated TCI-state provides quasi co-location information of the DM-RS antenna ports for PDCCH reception of CORESETs that are dedicatedly configured (block 406), quasi co-location information of the DM-RS antenna ports for PDSCH reception (block 408), and quasi co-location information for reception of CSI-RS resource configured with higher layer parameter trs-info and CSI-RS resource not configured with higher layer parameter trs-info or repetition (block 410).

Still referring to FIG. 4. In such an embodiment, the UE may assume to transmit the dedicated PUCCH resource with the same spatial domain transmission filter used for reception or transmission of the QCL-tyepD reference signal configured in the indicated TCI-state (block 412). The UE may assume to transmit the PUSCH with the same spatial domain transmission filter used for reception or transmission of the QCL-tyepD reference signal configured in the indicated TCI-state (block 414). The UE may assume to transmit an SRS resource configured for codebook-based, non-codebook-based or antenna switching with the same spatial domain transmission filter used for reception or transmission of the QCL-tyepD reference signal configured in the indicated TCI-state (block 416).

According to a second embodiment that configures a UE to operate in a common beam mode, the UE may be provided with a TCI-state through a L1 signaling such as DCI signaling. In such an embodiment, The DCI can be a DCI scheduling a PDSCH transmission. The DCI can be a DCI scheduling a PUSCH transmission. The DCI can be a dedicated DCI indicating a TCI-state providing common beam for downlink and uplink transmission.

Figure 5:
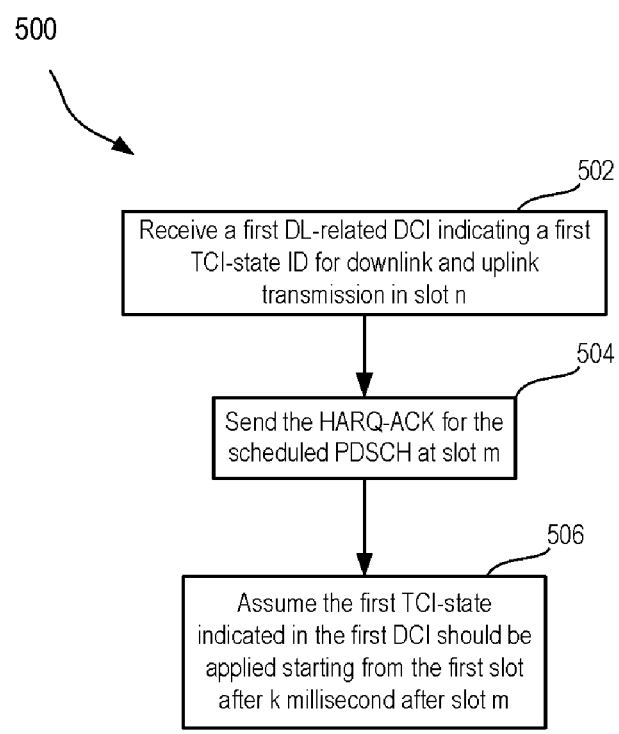
FIG. 5 is a schematic flow diagram illustrating a first exemplary method that implements a second embodiment.

FIG. 5 is a schematic flow diagram illustrating a first exemplary method 500 that implements the second embodiment. FIG. 5 shows that at block 502, the UE is provided with a first DL-related DCI (for example a DCI scheduling a PDSCH transmission) which may indicate a first TCI-state ID for downlink and uplink transmission in slot n. At block 504, the UE sends the HARQ-ACK for the scheduled PDSCH at slot m. At block 506, the UE may assume the first TCI-state indicated in the first DCI should be applied starting from the first slot after k millisecond after slot m. The UE may assume the DM-RS antenna ports associated with PDCCH, the DM-RS antenna ports associated with PDSCH, CSI-RS resource configured with higher layer parameter trs-info, and CSI-RS resource not configured with higher layer parameter trs-info or repetition are quasi co-located with the reference signal configured in the first TCI-state with respect to corresponding QCL type. The UE may assume to transmit PUSCH, PUCCH and SRS not configured with usage set to beamManagement with the same spatial domain transmission filter used for reception or transmission of the QCL-typeD reference signal configured in the first TCI-state.

Figure 6:
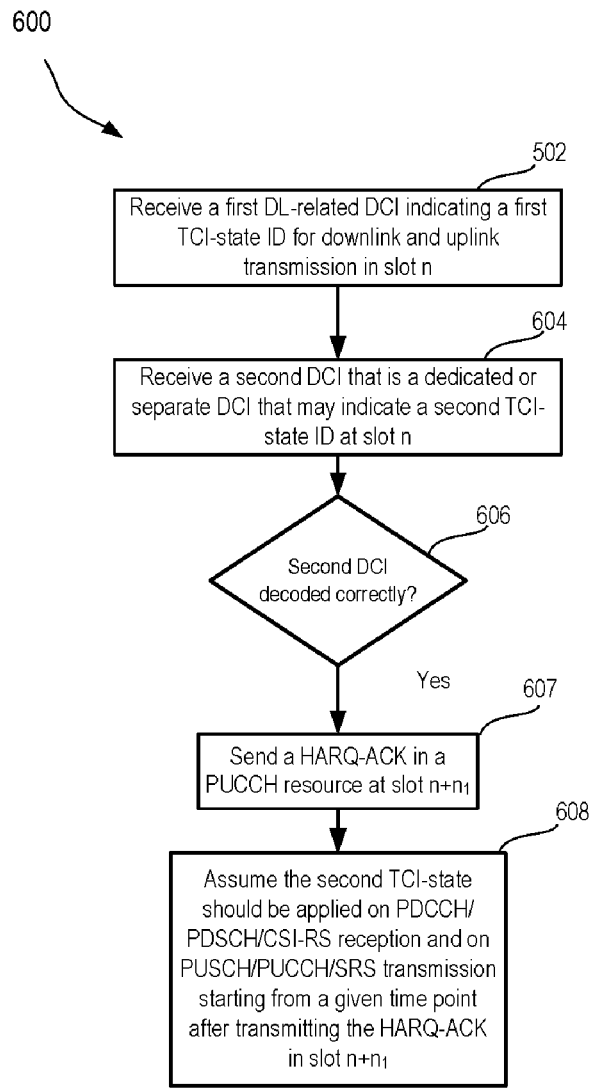
FIG. 6 is a schematic flow diagram illustrating a second exemplary method that implements the second embodiment.

FIG. 6 is a schematic flow diagram illustrating a second exemplary method 600 that implements the second embodiment. In method 600, certain act is similar to that in method 500 as shown in FIG. 5, and is marked with the same reference numerals.

In this second example, a second DCI that is a dedicated or separate DCI may indicate a second TCI-state ID at slot n at block 604. The second DCI does not schedule PDSCH or PUSCH transmission. At block 607, the UE can be requested to send a HARQ-ACK in a PUCCH resource at slot $n+n_1$ if the UE decodes the second DCI correctly at block 606. When the HARQ-ACK corresponding to the second DCI carrying the second TCI-state is transmitted in slot $n+n_1$, the UE shall assume the second TCI-state should be applied on PDCCH/PDSCH/CSI-RS reception and on PUSCH/PUCCH/SRS transmission starting from a given time point after transmitting the HARQ-ACK in slot $n+n_1$ (block 608). As a non-limiting example, the given time point may be the first slot that is after $n+n_1+P \times N_{slot}^{subframe,\mu}$, where P can be 1, 2, 3 or 4.

Figure 7:
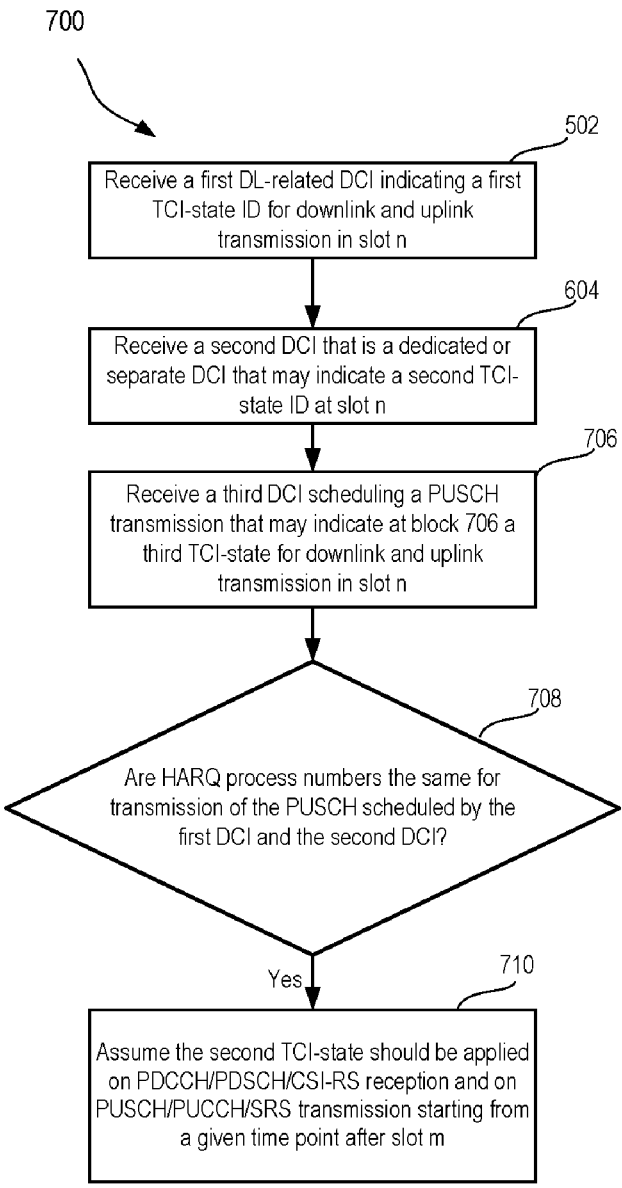
FIG. 7 is a schematic flow diagram illustrating a third exemplary method that implements the second embodiment.

FIG. 7 is a schematic flow diagram illustrating a third exemplary method 700 that implements the second embodiment. In method 700, certain acts are similar to those shown in FIGS. 5 and 6, and are marked with the same reference numerals.

In this third example of the second embodiment, a third DCI scheduling a PUSCH transmission may indicate a third TCI-state for downlink and uplink transmission in slot n, as shown in block 706 of FIG. 7. When the UE receives another DCI scheduling PUSCH transmission and determines the DCI has a same HARQ process number as for the transmission of the PUSCH scheduled by the first DCI (block 708) and having a toggled NDI field value in slot m, the UE shall assume the second TCI-state should be applied on PDCCH/PDSCH/CSI-RS reception and on PUSCH/PUCCH/SRS transmission starting from a given time point after slot m (block 710). As a non-limiting example, the given time point may be the first slot that is after $m+P \times N_{slot}^{subframe,\mu}$, where P can be 1, 2, 3 or 4.

Some aspects of the present disclosure are directed to a scenario where multiple serving cells are available to the UE, such as in a carrier aggregation scenario. Embodiments for such aspects are discussed below.

According to an aspect, a UE can be configured to operate in a common-beam mode on multiple serving cells. The UE can be provided with a list of serving cells and provided with a first reference signal resource Id (or a gNB Tx beam Id). The UE shall apply the first reference signal resource on the reception of PDCCH, PDSCH, CSI-RS for tracking or CSI acquisition in any serving cell configured in the list and the UE shall apply the first reference signal resource on the transmission of PUSCH, PUCCH and SRS not for uplink beam sweeping in any serving cell configured in the list. The UE can be provided with a list of serving cell Ids for the common-beam mode operation and the UE can be provided with a CSI-RS resource Id, SS/PBCH block index or a SRS resource index to provide QCL-typeD configuration for PDSCH transmission, PDCCH transmission and CSI-RS resource not for beam management in any of the serving cells configured in the list and to provide spatial relation info configuration for PUSCH transmission, PUCCH transmission and SRS resource not for beam management in any of the serving cells configured in the list. The first reference signal resource Id can be signaled via a separate or dedicated L1/L2 signaling. Since it is L1/L2 signaling, the system can indicate and switch the reference signal resource Id used for Tx beam for downlink and uplink transmission in those serving cells configured in the list dynamically.

In some embodiments, a UE may be provided with a first list of serving cell for common-beam operation. The UE may receive an MAC CE command carrying a TCI-state that provides QCL configuration for reception of PDCCH/PDSCH/CSI-RS not for beam management in any of the serving cell configured and spatial relation info for transmission of PUSCH, PUCCH and SRS not for beam management in any of the serving cell configured in the first list. In one example, the MAC CE may carry one ID of a cell list for common-beam operation. In one example, the MAC CE may carry one ID of a serving cell and the UE may determine the list of serving cells based on the indicated serving cell ID carried in the MAC CE. In one example, the UE may determine the list of serving cell for common-beam operation according to the serving cell on which the MAC CE is received. When the HARQ-ACK corresponding to the PDSCH carrying the MAC CE message carrying the TCI-state for common-beam operation for the first list of serving cells is in slot n, the UE may assume that the TCI-state indicated in the MAC CE should be applied to reception of PDSCH, PDCCH and CSI-RS resource not configured for beam management (for example, not configured with higher layer parameter repetition) in any of the serving cells configured in the first list and the UE may assume the QCL-typeD RS configured in the TCI-state indicated in the MAC CE should be applied to transmit PUSCH, PUCCH and SRS not configured with usage of beamManagement in any of the serving cells configured in the first list.

In some embodiments, a UE may be provided with a first list of serving cell for common-beam operation. The UE may receive an L1 signaling, for example a DCI command carrying a TCI-state that provides QCL configuration for reception of PDCCH/PDSCH/CSI-RS not for beam management in any of the serving cell configured, and spatial relation info for transmission of PUSCH, PUCCH and SRS not for beam management in any of the serving cell configured in the first list. In one example, the DCI may carry one ID of a cell list for common-beam operation. In one example, the DCI may carry one ID of a serving cell and the UE may determine the list of serving cells based on the indicated serving cell Id carried in the DCI. In one example, the UE can determine the list of serving cell for common-beam operation according to the serving cell on which the DCI is received. In one example, the DCI can be a DCI scheduling a PDSCH transmission. When the HARQ-ACK corresponding to the PDSCH carrying the MAC CE message carrying the TCI-state for common-beam operation for the first list of serving cells is in slot n, the UE may assume that the TCI-state indicated in the DCI should be applied to reception of PDSCH, PDCCH and CSI-RS resource not configured for beam management (i.e., not configured with higher layer parameter repetition) in any of the serving cells configured in the first list and the UE may assume the QCL-typeD RS configured in the TCI-state indicated in the DCI should be applied to transmit PUSCH, PUCCH and SRS not configured with usage of beamManagement in any of the serving cells configured in the first list.

In another example, the DCI may be a separate/dedicated DCI to indicate one TCI-state for those serving cells configured in the list and the UE shall send a HARQ-ACK if the UE detects the DCI correctly. When the HARQ-ACK corresponding to the DCI carrying the TCI-state for common-beam operation for the first list of serving cells in slot n, the UE may assume that the TCI-state indicated in the DCI should be applied to reception of PDSCH, PDCCH and CSI-RS resource not configured for beam management (for example, not configured with higher layer parameter repetition) in any of the serving cells configured in the first list and the UE shall assume the QCL-typeD RS configured in the TCI-state indicated in the DCI should be applied to transmit PUSCH, PUCCH and SRS not configured with usage of beamManagement in any of the serving cells configured in the first list.

Figure 8:
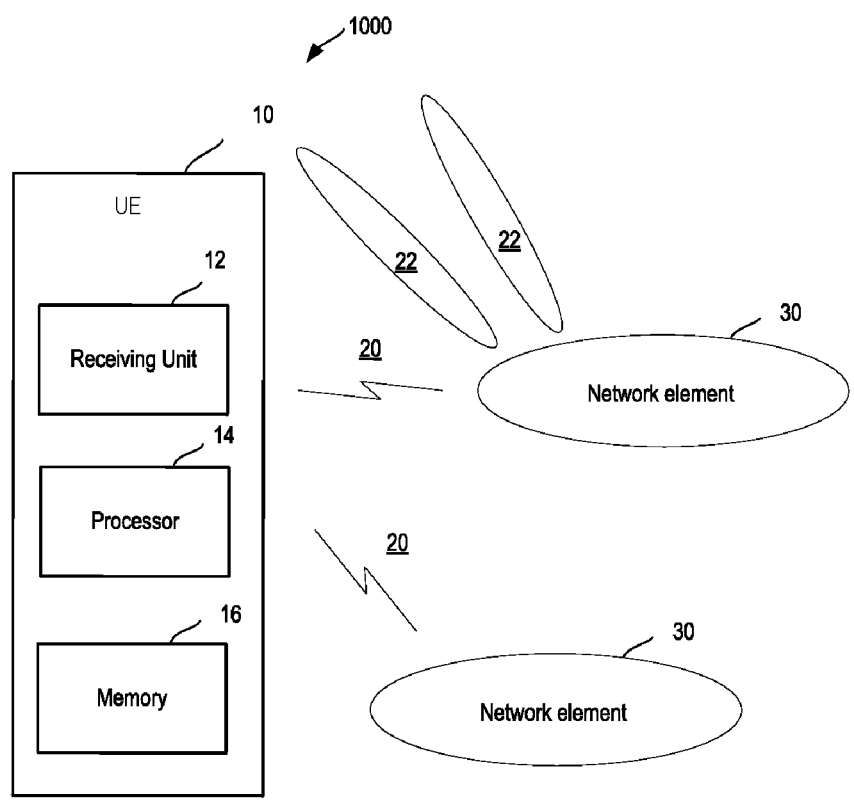
FIG. 8 is a schematic diagram of a mobile communication system to which any of the device and method disclosed above may be applied.

FIG. 8 is a schematic diagram of a mobile communication system 1000 to which any of the device and method disclosed above may be applied. In a mobile communication system, a UE such as a communication device may establish a link with a network element such as a cellular base station referred to as eNB for LTE, or gNB for 5G. The UE may communicate with the network element by transmitting or receiving voice, data and/or control signals. In FIG. 1, mobile communication system 1000 includes UE 10 in connection 20 with network elements 30, in accordance with some embodiments. UE 10 may be fixed, or mobile, and may be referred to as a mobile communication device, a mobile device, a user terminal, a wireless device, a smartphone, or other terminologies. UE 10 has one or more processors 14 and one or more memories 14. The at least one memories 16 are configured to store executable instructions or codes that, when executed by the at least one processors 14, cause the UE 10 to perform one or more methods as described throughout the present application. The at least one memories 16 are also configured to store data to be transmitted to or received from the network element. The network element 30 is generally a fixed station and may be a gNB, or an eNB. Network element 30 may be referred to as a base station, a cellular base station, an access point, a cell, etc. Although two network elements 30 are shown connected with the UE 10, it should be appreciated that aspects of the present application are not limited to the scenarios illustrated in FIG. 1. Network element 30 may send one or more beams 22, and connection 20 may be established via the one or more beams 22.

Having thus described several aspects of at least one embodiment of this disclosure, it is to be appreciated that various alterations, modifications, and improvements will readily occur to those skilled in the art.

Such alterations, modifications, and improvements are intended to be part of this disclosure, and are intended to be within the spirit and scope of the disclosure. Further, though advantages of the present disclosure are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Such alterations, modifications, and improvements are intended to be part of this disclosure, and are intended to be within the spirit and scope of the disclosure. Further, though advantages of the present disclosure are indicated, it should be appreciated that not every embodiment of the disclosure will include every described advantage. Some embodiments may not implement any features described as advantageous herein and in some instances. Accordingly, the foregoing description and drawings are by way of example only.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a communication device to wirelessly communicate, the method comprising:
   receiving a reference transmission that provides a reference signal ID indicative of one or more characteristics for multiple uplink channels, downlink channels and reference signals;
   configuring, by the communication device, one or more transmissions subsequent to receiving the reference transmission based on the one or more characteristics indicated in the reference signal ID;
   receiving a first DCI scheduling a PDSCH transmission indicating a first TCI-state; and
   requesting transmission of a HARQ-ACK for the scheduled PDSCH at slot m,
   wherein the first DCI is the reference transmission and the reference signal ID is carried in the first TCI-state indicated by a first TCI-state ID; and
   wherein configuring the one or more transmissions comprises:
   assuming the one or more characteristics indicated in the first TCI-state for the one or more transmissions start from a given time point after sending the HARQ-ACK at slot m.

2. The method of claim 1, wherein the reference signal ID is carried through a TCI-state.

3. The method of claim 2, wherein the reference transmission comprises a DCI signaling.

4. The method of claim 2, wherein the one or more characteristics comprises a QCL value, and a QCL-typeD value.

5. The method of claim 4, wherein configuring the one or more transmissions comprises:
   assuming the QCL value for the one or more transmissions, wherein
   the one or more transmissions are downlink transmissions that comprise one or more of:
   a PDCCH;
   a PDSCH;
   a CSI-RS resource configured with higher layer parameter trs-info; and a CSI-RS resource configured without higher layer parameter trs-info and without higher layer parameter repetition.

6. The method of claim 2, wherein the one or more characteristics comprises a spatial domain transmission filter for uplink channels and reference signals.

7. The method of claim 6, wherein configuring the one or more transmissions comprises:
assuming the spatial domain transmission filter for the one or more transmissions, wherein
the one or more transmissions are uplink transmissions that comprise one or more of:
a PUSCH;
a PUCCH; and
an SRS resource that is not configured for beamManagement.

8. The method of claim 1, wherein the reference transmission comprises a MAC CE message.

9. The method of claim 1, wherein the reference signal ID is a beam ID.

10. A communication device, comprising:
a receiver configured to receive a reference transmission that provides a reference signal ID indicative of one or more characteristics; and
a processor configured to configure one or more transmissions subsequent to receipt of the reference transmission based on the one or more characteristics indicated in the reference signal ID, wherein
the receiver is further configured to:
receive a first DCI scheduling a PDSCH transmission indicating a first TCI-state; and
the processor is further configured to:
request transmission of a HARQ-ACK for the scheduled PDSCH at slot m,
the first DCI is the reference transmission and the reference signal ID is carried in the first TCI-state indicated by a first TCI-state ID; and
configuring the one or more transmissions comprises:
assuming the one or more characteristics indicated in the first TCI-state for the one or more transmissions start from a given time point after sending the HARQ-ACK at slot m.

11. The communication device of claim 10, wherein the reference signal ID is carried through a TCI-state.

12. The communication device of claim 11, wherein the reference transmission comprises a DCI signaling.

13. The communication device of claim 11, wherein the one or more characteristics comprises a QCL value, and a QCL-typeD value.

14. The communication device of claim 11, wherein the one or more characteristics comprises a spatial domain transmission filter for uplink channels and reference signals.

* * * * *